(12) United States Patent
Kim

(10) Patent No.: US 8,924,628 B2
(45) Date of Patent: Dec. 30, 2014

(54) MEMORY SYSTEM AND OPERATING METHOD THEREOF

(75) Inventor: Sung-joo Kim, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 360 days.

(21) Appl. No.: 13/075,361

(22) Filed: Mar. 30, 2011

(65) Prior Publication Data

US 2011/0258368 A1 Oct. 20, 2011

(30) Foreign Application Priority Data

Apr. 20, 2010 (KR) ........................ 10-2010-0036526

(51) Int. Cl.
*G06F 13/00* (2006.01)
*G06F 13/28* (2006.01)
*G06F 12/02* (2006.01)

(52) U.S. Cl.
CPC .................................. *G06F 12/0246* (2013.01)
USPC ..................... 711/103; 711/165; 711/E12.008

(58) Field of Classification Search
USPC ................................... 711/103, 165, E12.008
See application file for complete search history.

(56) References Cited

U.S. PATENT DOCUMENTS

| 7,573,754 | B2 | 8/2009 | Kim et al. | |
|---|---|---|---|---|
| 2002/0041517 | A1* | 4/2002 | Kim et al. | 365/185.11 |
| 2008/0189473 | A1 | 8/2008 | Murray | |
| 2008/0282024 | A1* | 11/2008 | Biswas et al. | 711/103 |
| 2009/0010073 | A1* | 1/2009 | Kim et al. | 365/185.23 |
| 2009/0259919 | A1* | 10/2009 | Kilzer et al. | 714/773 |
| 2009/0300276 | A1* | 12/2009 | Torabi | 711/103 |
| 2010/0011276 | A1* | 1/2010 | Chen et al. | 714/764 |
| 2010/0162083 | A1* | 6/2010 | Chung et al. | 714/764 |
| 2010/0306583 | A1* | 12/2010 | Kim et al. | 714/8 |
| 2011/0283058 | A1* | 11/2011 | Araki et al. | 711/103 |
| 2012/0204071 | A1* | 8/2012 | Abali et al. | 714/723 |

FOREIGN PATENT DOCUMENTS

| JP | 2008-010140 | 1/2008 |
|---|---|---|
| KR | 100736103 | 6/2007 |
| KR | 1020090107309 | 10/2009 |
| KR | 1020090117787 | 11/2009 |

* cited by examiner

*Primary Examiner* — Edward Dudek, Jr.

(74) *Attorney, Agent, or Firm* — Ellsworth IP Group PLLC

(57) ABSTRACT

A memory system includes a non-volatile memory device including a plurality of pages and a controller connected electrically with the non-volatile memory device and configured to control the non-volatile memory device. The non-volatile memory device is configured to be capable of storing data from a set number of write operations before data erasing with respect to each page; and wherein the controller is configured to divide each page of the non-volatile memory device into first and second areas, to perform a write operation of the first area by the NOP, and to write an invalidation mark in the second area.

16 Claims, 12 Drawing Sheets

MEMORY SYSTEM AND OPERATING METHOD THEREOF

CROSS-REFERENCE TO RELATED APPLICATIONS

This application claims the benefit, under 35 U.S.C §119, of Korean Patent Application No. 10-2010-0036526 filed Apr. 20, 2010, the entirety of which is incorporated by reference herein.

BACKGROUND

1. Field of the Invention

Exemplary embodiments relate to a semiconductor memory device, and more particularly, relate to a memory system and an operating method thereof.

2. Description of the Related Art

Semiconductor memory devices may be memory devices which are fabricated using semiconductor materials such as silicon (Si), Germanium (Ge), gallium arsenide (GaAs), indium phosphide (Inp), and the like. Semiconductor memory devices are mainly divided into volatile memory devices and non-volatile memory devices.

A volatile memory device is a memory device which loses stored data at power-off, and includes SRAM, DRAM, SDRAM, and the like. A non-volatile memory device is a memory device which retains stored data even at power-off, and includes Read Only Memory (ROM), Programmable ROM (PROM), Electrically PROM (EPROM), Electrically Erasable PROM (EEPROM), flash memory device, Phase-change RAM (PRAM), Resistive RAM (RRAM), Ferroelectric RAM (FRAM), and the like. A flash memory device is roughly divided into a NOR type and a NAND type.

A non-volatile semiconductor memory device has been used to store data and program codes in systems such as computers and microprocessor-based applications ranging from satellites to consumer electronics.

SUMMARY

The present general inventive concept relates to controlling a non-volatile memory device to prevent devices from reading insecure data from the non-volatile memory device.

Additional aspects and utilities of the present general inventive concept will be set forth in part in the description which follows and, in part, will be obvious from the description, or may be learned by practice of the present general inventive concept.

Features and/or utilities of the present general inventive concept may be realized by a memory system comprising a non-volatile memory device including a plurality of pages and a controller connected electrically with the non-volatile memory device and configured to control the non-volatile memory device. The non-volatile memory device may be configured to guarantee the validity of data for a predetermined number of partial programs (NOP) of the non-volatile memory before data erasing with respect to each page. The controller is configured to divide each page of the non-volatile memory device into first and second areas, to perform a write operation of the first area by the NOP, and to write an invalid mark in the second area.

Another aspect of embodiments of the inventive concept is directed to provide an operating method of a memory system which includes a page securing a predetermined number of partial program (NOP) before data erasing. The operating method comprises performing a number of write operations to a first area of the page up to the NOP and writing an invalid mark at a second area of the page.

Features and/or utilities of the present general inventive concept may also be realized by a method of managing a non-volatile memory device which includes a user data region and a meta data region, the method including judging whether data stored in the user data region is invalidated and if data stored in the user data region is invalidated, storing an "invalid" mark in a page of the user data region in which the invalidated data is stored.

Features and/or utilities of the present general inventive concept may also be realized by a method of controlling non-volatile memory, the method including determining whether a program threshold of a segment of memory has been reached and marking the segment of memory as "invalid" when the program threshold has been reached.

The method may include, before determining whether the program threshold has been reached, receiving a write command to write data to the segment of memory, and when it is determined that the program threshold has been reached, performing a write operation corresponding to the write command at another segment of memory.

The segment of memory may be a page corresponding to each memory cell along a word line of the non-volatile memory.

The segment of memory may include at least a first portion to store program data and a second portion to indicate whether the segment of memory is valid or invalid.

Marking the segment of memory as "invalid" may include changing a program state of each bit of the second portion to a same program state.

The second portion may be located within the first portion.

Marking the segment of memory as "invalid" may include performing a write operation to make each bit of a predetermined block of the segment have a same program state.

The method may further include, after marking the segment of memory as "invalid," erasing each bit of the segment of memory other than the predetermined block.

Features and/or utilities of the present general inventive concept may also be realized by a method of controlling non-volatile memory, the method including receiving a read command to read data from a segment of memory, determining whether the segment of memory is valid, and preventing a read operation of the segment of memory corresponding to the read command when the segment of memory is determined to be invalid.

Determining whether the segment of memory is invalid may include reading a predetermined portion of the segment of memory.

The segment of memory may be determined to be invalid if at least a predetermined number of bits of the predetermined portion has a same program state.

Features and/or utilities of the present general inventive concept may also be realized by a memory system including non-volatile memory to store data and a controller to determine whether a program threshold of a first segment of memory has been reached and to mark the first segment of memory as "invalid" when the program threshold has been reached.

The controller may perform a write operation to a second segment of memory when the controller receives a write command to write to the first segment of memory and the controller determines that the program threshold of the first segment has been reached.

The controller may mark the second portion as "invalid" by changing a program state of each bit of the second portion to a same program state.

The controller may mark the first segment as "invalid" by performing a write operation to make each bit of a predetermined block of the first segment have a same program state.

After marking the first segment as "invalid," the controller may erase the data of each bit of the first segment other than the predetermined block.

The controller may include memory to store a table to indicate which segments among a plurality of segments of the non-volatile memory is invalid.

BRIEF DESCRIPTION OF THE DRAWINGS

The above and other objects and features of the present general inventive concept will become apparent from the following description with reference to the following figures, wherein like reference numerals refer to like parts throughout the various figures unless otherwise specified, and wherein.

DETAILED DESCRIPTION OF THE EMBODIMENTS

Figure 1:
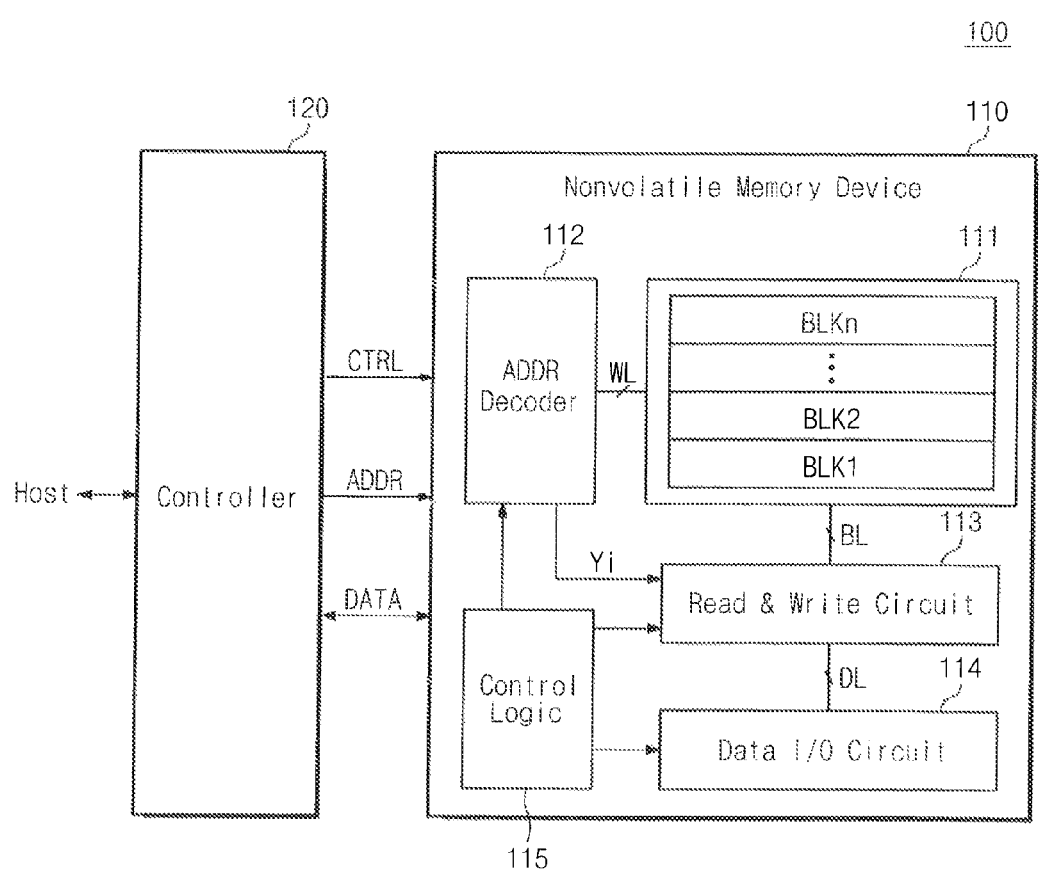
FIG. 1 is a block diagram showing a memory system according to an exemplary embodiment of the present general inventive concept.

The present general inventive concept is described more fully hereinafter with reference to the accompanying drawings, in which embodiments of the present general inventive concept are shown. This present general inventive concept may, however, be embodied in many different forms and should not be construed as limited to the embodiments set forth herein. Rather, these embodiments are provided so that this disclosure will be thorough and complete, and will fully convey the scope of the present general inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram showing a memory system according to an exemplary embodiment of the present general inventive concept. Referring to FIG. 1, a memory system 100 includes a non-volatile memory device 110 and a controller 120.

The controller 120 is connected to a host and the non-volatile memory device 110. The controller 120 is configured to access the non-volatile memory device 110 in response to a request from the host. For example, the controller 120 may be configured to control read, write, and erase operations of the non-volatile memory device 110. The controller 120 may be configured to control a background operation of the non-volatile memory device 110. For example, the controller 120 may control the non-volatile memory device 110 such that merge and garbage collection operations are performed with respect to the non-volatile memory device 110. The controller 120 may be configured to provide an interface between the memory device 110 and the host. The controller 120 may be configured to drive firmware for controlling the non-volatile memory device 110. The controller 120 may be configured to provide a control signal CTRL and an address ADDR to the non-volatile memory device 110 and to exchange data with the non-volatile memory device 110.

The controller 120 may further include elements such as RAM, a processing unit, a host interface, and a memory interface. The RAM may be used as at least one of an operating memory of the processing unit, a cache memory between the memory device 110 and the host, and a buffer memory between the memory device 110 and the host. The processing unit controls an overall operation of the controller 120.

The host interface includes a protocol for data exchange between the host and the controller 120. For example, the controller 120 may be configured to communicate with an external device, such as the host, through at least one of various interface protocols such as USB (Universal Serial Bus) protocol, MMC (multimedia card) protocol, PCI (peripheral component interconnection) protocol, PCI-E (PCI-express) protocol, ATA (Advanced Technology Attachment) protocol, Serial-ATA protocol, Parallel-ATA protocol, SCSI (small computer small interface) protocol, ESDI (enhanced small disk interface) protocol, and IDE (Integrated Drive Electronics) protocol. The memory interface interfaces with the non-volatile memory device 120. For example, the memory interface includes a NAND interface or a NOR interface.

The controller 120 and the non-volatile memory device 110 may be integrated in one semiconductor device. For example, the controller 120 and the non-volatile memory device 110 may be integrated in one semiconductor device to form a memory card. Examples of memory cards may include a PC card (PCMCIA, personal computer memory card international association), compact flash card (CF), smart media card (SM, SMC), memory stick, multimedia card (MMC, RS-MMC, MMCmicro), SD card (SD, miniSD, microSD, SDHC), universal flash storage (UFS), and the like.

The controller 120 and the non-volatile memory device 110 may be integrated in one semiconductor device to form SSD (Solid State Drive). The SSD includes a storage device which is configured to store data in a semiconductor memory. In the event that the memory system 100 is used as the SSD, an operating speed of a host connected with the memory system 100 may be improved as compared to a disk drive, for example.

The memory system 100 may be any type of computer, such as a UMPC (Ultra Mobile PC), workstation, net-book, PDA (Personal Digital Assistants), portable computer, web tablet, wireless phone, mobile phone, smart phone, e-book, PMP (portable multimedia player), portable game machine, navigation devices, black box, digital camera, DMB (Digital Multimedia Broadcasting) player, digital audio recorder, digital audio player, digital picture recorder, digital picture player, digital video recorder, digital video player, a device capable of transmitting and receiving information at RF circumstance, one of electronic devices constituting a home network, one of electronic devices constituting a computer network, one of electronic devices constituting a telemetric network, RFID device, or one of electronic devices constituting a computing system.

The non-volatile memory device 110 or the memory system 100 may be packaged using various types of packages. For example, the non-volatile memory device 110 or the memory system 100 may be packaged using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The non-volatile memory device 110 comprises a memory cell array 111, an address decoder 112, a read and write circuit 113, a data input/output circuit 114, and control logic 115.

The memory cell array 111 is electrically connected both to the address decoder 112 via word lines WL and to the read and write circuit 113 via bit lines BL. The memory cell array 111 includes a plurality of, for example, N memory blocks BLK1 to BLKn, each of which includes a plurality of memory cells. Memory cells arranged in row directions are connected to word lines WL, and memory cells arranged in column directions are connected to bit lines BL. For example, memory cells arranged in one column form one memory cell group (for example, a string), which is connected to one of bit lines BL.

The address decoder 112 is connected to the memory cell array 111 via word lines WL. The address decoder 112 is configured to operate responsive to the control of the control logic 115. The address decoder 112 receives an address ADDR from an external device.

The address decoder 112 is configured to decode a block address among the received address ADDR. The address decoder 112 can activate one memory block or plural memory blocks using the decoded block address.

The address decoder 112 is configured to decode a row address among the received address ADDR. The address decoder 112 selects word lines WL using the decoded row address. The address decoder 112 is configured to decode a column address among the received address ADDR. The decoded column address Yi is sent to the read and write circuit 113. The address decoder 112 may include a block decoder, a row decoder, a column decoder, an address buffer, etc.

The read and write circuit 113 is connected to the memory cell array 111 via bit lines BL and to the data input/output circuit 114 via data lines DL. The read and write circuit 113 operates responsive to the control of the control logic 115. The read and write circuit 113 is configured to receive the decoded column address Yi from the address decoder 112. The read and write circuit 113 selects bit lines BL using the decoded column address.

The read and write circuit 113 receives data from the data input/output circuit 114. The received data may be programmed at a selected page at a program operation. At a read operation, the read and write circuit 113 reads data from a selected page and transfers the read data to the data input/ output circuit 114. For example, the read and write circuit 113 may include a page buffer (or, a page register), a column selector, and the like.

The data input/output circuit 114 is connected with the read and write circuit 113 via data lines DL. The data input/output circuit 114 operates responsive to the control of the control logic 115. The data input/output circuit 114 is configured to exchange data with the controller 120. The data input/output circuit 114 is configured to transfer data from the controller 120 into the read and write circuit 113 via the data lines DL. The data input/output circuit 114 is configured to output to the external device, data transferred from the read and write circuit 113 via the data lines DL. For example, the data input/output circuit 114 may include a data buffer, etc.

The control logic 115 is electrically connected with the address decoder 112, the read and write circuit 113, and the data input/output circuit 114. The control logic 115 is configured to control an overall operation of the non-volatile memory device 100. The control logic 115 operates responsive to a control signal from the external device.

The non-volatile memory device 110 may include at least one of a flash memory, EEPROM, PRAM, MRAM, FeRAM, RRAM, and the like.

Figure 2:
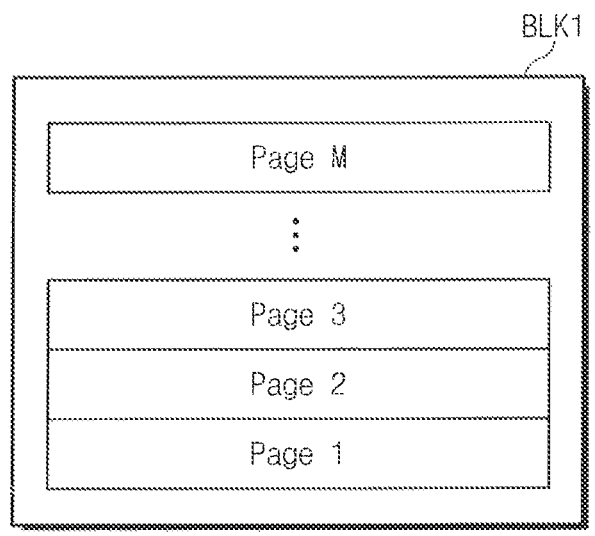
FIG. 2 is a block diagram showing the first memory block of a memory cell array in FIG. 1.

FIG. 2 is a block diagram showing the first memory block of a memory cell array in FIG. 1. The first memory block BLK1 may include a plurality of memory cell groups (not shown). Memory cells arranged in one row may constitute one memory cell group, which is connected with one of word lines WL. In the present specification and claims, a group of memory cells of a predetermined size is referred to as a "page." For example, the memory cells arranged in the same row are along the same word line may together make up one page.

The first memory block may be formed of a plurality of pages. In FIG. 2, the total number of pages is represented by the letter M. Each page is formed of a plurality of memory cells. For example, each page may be formed of 512 or 2K memory cells which share one word line. In FIG. 2, there is shown only the first memory block BLK1. But, the remaining memory blocks BLK2 to BLKn may be substantially identical to that BLK1 in FIG. 2.

In case of the NAND flash memory device, read and program operations are carried out in a page unit, and an erase operation is carried out in a block unit. For example, data in the first memory block BLK1 is erased by one erase operation, while read operations may be performed on a page-by-page basis.

When data of a page in a memory block is determined to be invalid, an invalidation marking may be made at a predetermined area in the page. When data of the first page in the first memory block BLK1 is updated, the data of the first page is copied to a page (not shown) of another memory block within a memory cell array 111 (refer to FIG. 1). Then, an invalidation marking may be made at given region (not shown) in the first page.

During a read operation, if the controller 120 determines that an invalidation marking is made at the given region of a first page, the controller 120 prohibits reading of data stored in the first page, which will be more fully described with reference to FIG. 8.

Figure 3:
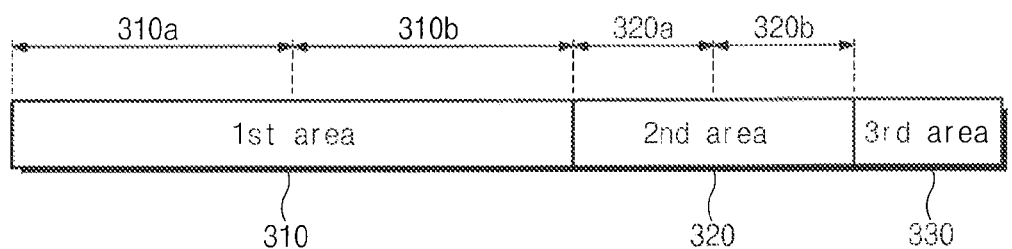
FIG. 3 is a block diagram showing the first page in the first memory block of FIG. 2 according to an embodiment of the present general inventive concept.

FIG. 3 is a block diagram showing the first page in the first memory block of FIG. 2 according to an embodiment of the inventive concept.

Referring to FIG. 3, the first page includes the first to third areas 310, 320, and 330, each of which is formed of a plurality of memory cells (not shown). Each memory cell may be a single level cell (SLC) or multi level cell (MLC). The remaining pages in the first memory block BLK1 are configured to be identical to that in FIG. 3.

The first area 310 is an area in which user data is stored. The second area 320 stores additional data which indicates state information of user data. For example, in a case where each memory cell is MLC, additional data indicates whether data written at the first area 310 is LSB data or MSB data. For example, the spare data may include ECC code. In other words, in the present specification and claims, user data indicates data that is used by the controller 120 or a processor to directly perform functions or carry out programs. On the other hand, the additional data is data that may be used by the controller 120 or a processor to determine characteristics of the user data, to aid the controller 120 or other processor to know how to read the user data. The additional data may not be used or manipulated by the controller to perform operations of the memory system 100, for example.

When data in the first and second areas 310 and 320 is updated or determined to be invalid, an invalidation marking can be made at a given region of the first page. For example, an invalidation mark may be written at the third area 330 to indicate invalidation of data stored in the first and second areas 310 and 320.

The non-volatile memory device 110 is configured so that data in any given page of the non-volatile memory device is presumed to be valid as long as the number of write operations to the page is equal to or less than the number of partial programs (NOP). For example, if the NOP is 4, the first page is divided into four areas, and each of the four areas may be written to. If the NOP is 1, the first page experiences only one program operation, or only one write operation may be performed to the first page before the data is not guaranteed to be valid, or before that data is determined to be invalid. The NOP may also be referred to as a program or write limit of a page, or a program or write threshold number, for example. The NOP is a value that is fixed for each separate non-volatile memory device, but may vary from one device to another, depending upon physical characteristics of the non-volatile memory device, such as manufacturing and design specifications.

Threshold voltages of previously programmed memory cells in a page may increase if a program voltage is applied to the previously programmed memory cells. That is, threshold voltages of memory cells may vary due to repetitive applying of read and read-inhibit voltages, the coupling between memory cells, a disturb phenomenon, etc. Thus, since write operations may be carried out in groups of blocks, and each block includes multiple pages, then one page may be written two multiple times to correspond to new data being written to different pages of the block.

In the event that a page is programmed within the given number of partial programs (NOP), the data stored in memory cells of the page is presumed or determined to be valid. Although threshold voltages of memory cells are varied, original data stored in the memory cells may be read out from the page at a read operation. In the event that a page is programmed over the given number of partial program, there is secured no data integrity, or the data cannot be presumed to be valid. Although a read operation is carried out using an original read voltage, data different from originally programmed data may be read due to increase in a threshold voltage distribution.

With the present general inventive concept, writing may be made at the first and second areas 310 and 320 within the number of partial program (NOP) before the data in the first and second areas 310 and 320 is invalidated and/or erased. For example, when the NOP is 2, memory cells of the first and second areas 310 and 320 may each be divided into first and second groups. After the first group is programmed, the second group is programmed. That is, two program operations may be carried out in the same page to write data to the page. For example, the first program operation is made with respect to memory cells corresponding to 310a and 320a among memory cells in the first page, and the second program operation is made with respect to memory cells corresponding to 310b and 320b among memory cells in the first page. Alternatively, the write operation may be performed with respect to the entire first and second areas 310 and 320 until the NOP is reached or exceeded.

After a write operation corresponding to the NOP is carried out with respect to the first and second areas 310 and 320, an invalidation mark is further written at the third area 330 in a third program operation or write operation. In a case where the invalidation mark is written, memory cells in the third area 330 may be programmed to have a logic value '0' (or, a threshold voltage corresponding to the logic state/value '0'). When the NOP value is 1, a program operation is carried out with respect to memory cells in the first and second areas 310 and 320, and the second program operation is carried out with respect to memory cells in the third area 330, so that invalidation marking is made at the third area 330.

According to the present general inventive concept, it is possible to program a number of times greater than the NOP. In other words, when a page is written to a number of times above the NOP, then an invalidation mark may be written to the third area 330. Since data stored in the first and second areas 310 and 320 is invalidated or erased according to the invalidation mark, there is no problem of reading damaged data from the first and second areas 310 and 320, even when the page is written to a number of times greater than the NOP.

Arrangement of the first to third areas 310 to 330 in FIG. 3 is not limited to the above-described arrangement. Instead, the first to third areas 310 to 330 may be of any desired size and may be arranged in any desired order. In addition, other areas may be added to store various other types of data, as needed.

Figure 4:
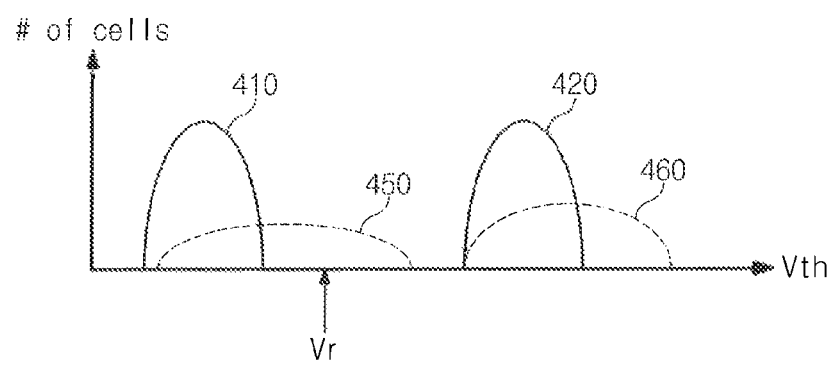
FIG. 4 is a diagram showing a threshold voltage distribution of memory cells includes in the third area of FIG. 3.

FIG. 4 is a diagram showing a threshold voltage distribution of memory cells includes in the third area 330 of FIG. 3. In FIG. 4, a horizontal axis indicates threshold voltages of memory cells, and a vertical axis indicates the number of memory cells. A voltage Vr is a read voltage for judging states of memory cells.

A threshold voltage distribution is illustrated in FIG. 4 in which each memory cell is SLC (a single level cell). But, the present general inventive concept is not limited to SLC. For example, the present general inventive concept may also be applied to MLC (a multi-level cell).

Memory cells in the third area 330 (refer to FIG. 3) are programmed to have threshold voltages corresponding to the first state 410 and the second state 420. For example, the first state 410 corresponds to a logic value '1', and the second state 420 corresponds to a logic value '0'.

A threshold voltage distribution of the first state 410 can be changed into a state 450 which is illustrated by a dotted line. Likewise, a threshold voltage distribution of the second state 420 can be changed into a state 460 which is illustrated by a dotted line. For example, variation of the threshold voltage distribution can be made when a read voltage Vr or a read-inhibition voltage (not shown) continues to be applied to the third area 330. Alternatively, variation of the threshold voltage distribution can be made due to the coupling between a memory cell of a selected word line and adjacent memory cells. Alternatively, variation of the threshold voltage distribution can be made when MSB data is written at the third area 330 with LSB data programmed thereat.

The first state 410 does not include memory cells each having a threshold voltage higher than a read voltage Vr. On the other hand, the state 450 includes memory cells each having a threshold voltage higher than a read voltage Vr. At a read operation, data different from originally programmed data can be read out.

Memory cells in the second state 420 have threshold voltages higher than the read voltage Vr. Although threshold voltages of the memory cells corresponding to the second state 420 are changed, changed threshold voltages of the memory cells may be higher than the read voltage Vr. Like the second state 420, memory cells corresponding to a state 460 have their threshold voltages higher than the read voltage Vr. Accordingly, although threshold voltages of memory cells are changed, at a read operation, data identical to originally programmed data can be read out.

Figure 5:
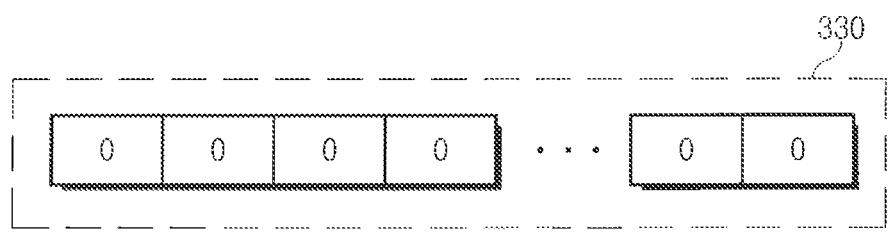
FIG. 5 is a block diagram showing an exemplary embodiment in which a logic value '0' is written at the third area of FIG. 3.

FIG. 5 is a block diagram showing an exemplary embodiment in which a logic value '0' is written at the third area of FIG. 3.

Referring to FIG. 5, an invalidation mark may be formed of a plurality of bits, which indicate the second state 420. The second state 420 corresponds to a logic value '0'.

Referring to FIGS. 3 to 5, in the event that memory cells in the third area 330 have a threshold voltage corresponding to the second state 420, the threshold voltage of the memory cells in the third area 330 retain higher than the read voltage Vr although their threshold voltages are changed. Accordingly, the reliability of the invalidation mark written at the third area 330 is guaranteed although data of the memory cells in the third area 330 is written over the given number of partial program (NOP).

Figure 6A:
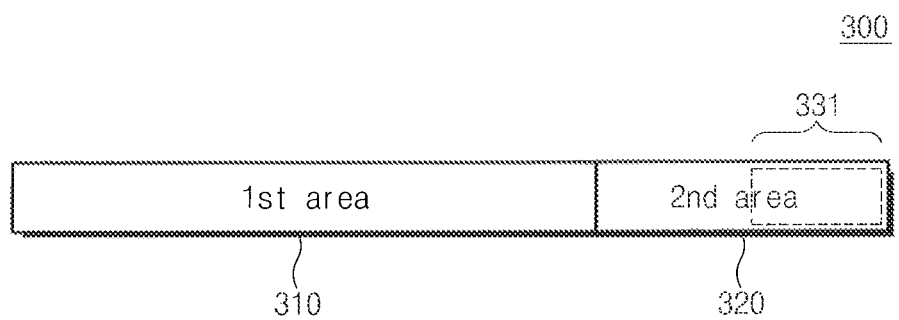
FIG. 6A is a block diagram showing the first page of the first memory block in FIG. 2 according to another embodiment of the present general inventive concept.

FIG. 6A is a block diagram showing the first page of the first memory block in FIG. 2 according to another embodiment of the present general inventive concept.

Referring to FIG. 6A, the first page 300 includes the first and second areas 310 and 320. The second area 320 includes the third area 331. The first and second areas 310 and 320 are configured the same as described in FIG. 3. In the event that a program operation is carried out at the first page 300, a number of write operations may be carried out with respect to the first and second areas 310 and 320 up to the NOP. For example, when the NOP is 1, one program operation is carried out to the first and second areas 310 and 320 before data is invalidated or erased.

In the event that data of the first and second areas 310 and 320 are updated or invalidated, an invalidation mark may be written at the third area. That is, after a number of write operations is carried out to the first and second areas 310 and 320 up to the NOP, an invalidation mark can be further written at the third area 331. Accordingly, it is possible to write an invalidation mark at the third area 331 although the number of write operations exceeds the NOP.

Before an invalidation mark is written, bits in the third area 331 can have an either an erase or write state. If an invalidation mark is written at the third area 331, bits in the third area 331 all may be changed to a write state. For example, data stored in the second area 320 may be read out by a read and write circuit 113. Depending upon the read data, there is judged whether states of memory cells in the third area 331 are an erase state or a write state. A write operation may be carried out to the memory cells of in the third area 331 so as to change threshold voltages of memory cells of erase state to threshold voltages corresponding to the write state. As a result, all of the memory cells of in the third area 331 may have the write state.

In an exemplary embodiment, a program voltage may be applied to a word line (not shown) connected with the first page 300. A program inhibition voltage (not shown) may be applied to bit lines connected with memory cells of the first page 300 except for the third area 331. A program inhibition voltage may be applied to bit lines connected with memory cells of the write state in the third area 331. As a result, threshold voltages of memory cells having the erase state in the third area 331 may be changed to threshold voltages corresponding to the write state The third area 331 may include a plurality of bits. As bits in the third area increase, the reliability of the invalidation mark improves. For example, an third area having a size of one byte has a higher reliability than a third area having a size of two bits. Likewise, a third area having a size of two bytes has a higher reliability than a third area having a size of one byte.

Figure 6B:
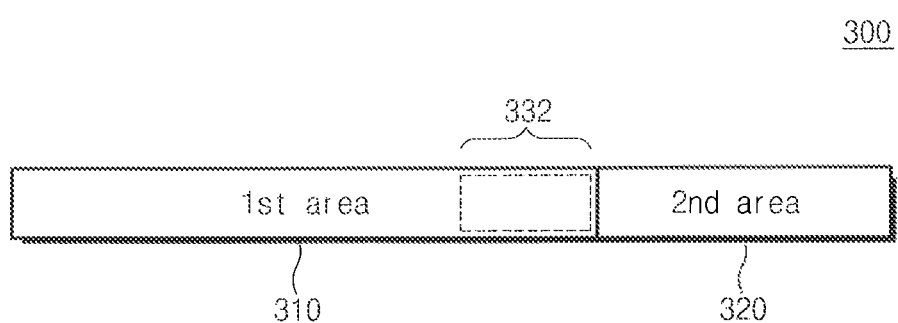
FIG. 6B is a block diagram showing the first page of the first memory block in FIG. 2 according to another embodiment of the present general inventive concept.

FIG. 6B is a block diagram showing the first page of the first memory block in FIG. 2 according to another embodiment of the present general inventive concept.

Referring to FIG. 6B, the first page 300 includes the first and second areas 310 and 320. The first area 310 includes the third area 332. As described in FIG. 6A, a number of write operations may be carried out to the first and second areas 310 and 320 up to the NOP. When data of the first and second areas 310 and 320 is updated or invalidated, an invalidation mark can be written at the third area 332 even when the number of write operations exceeds the NOP.

Figure 7:
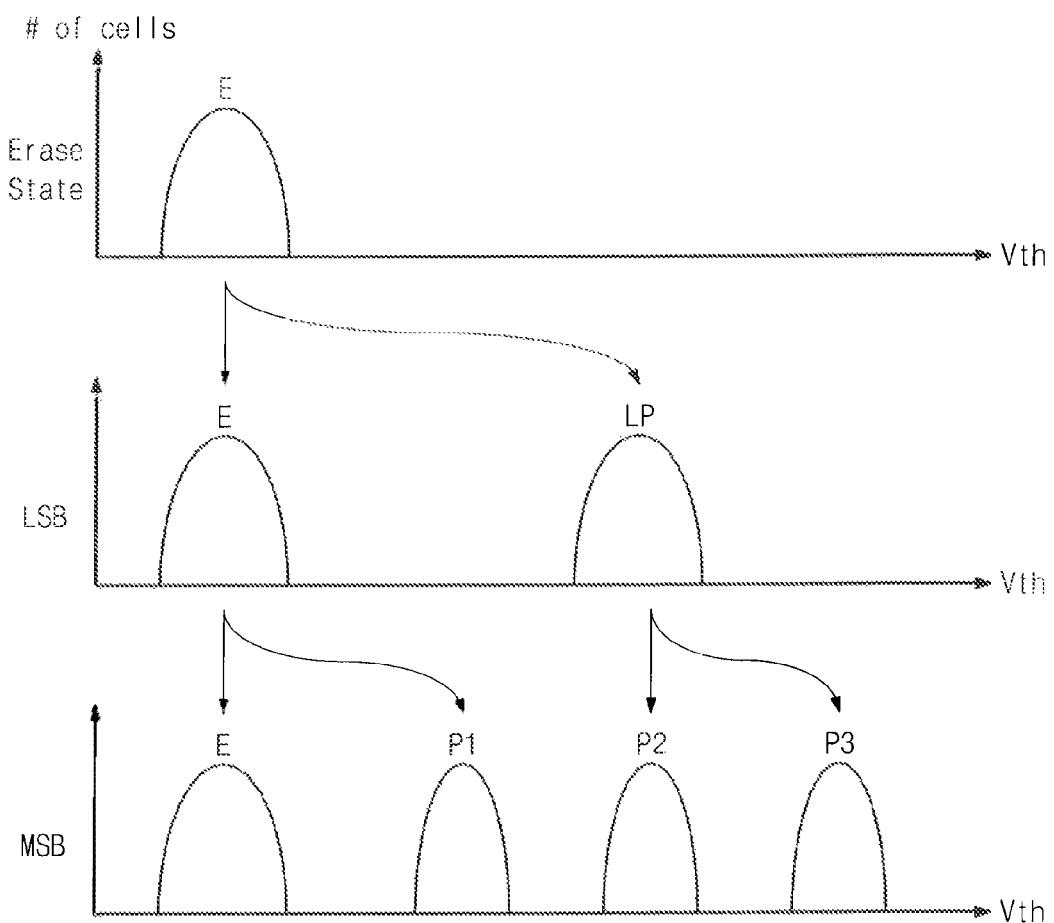
FIG. 7 is a diagram showing variations of threshold voltages when upper bit data is programmed at the third area of FIG. 3.

FIG. 7 is a diagram showing variations of threshold voltages when upper bit data is programmed at the third area of FIG. 3. In FIG. 7, there is illustrated a threshold voltage distribution when 2-bit data is stored in a memory cell. But, the present general inventive concept is not limited to the case 2-bit data is stored in a memory cell. Memory cells are configured to store at least one bit per cell.

First of all, if LSB data is programmed, memory cells have either one of two states (including an erase state E and a lower program state LP) according to their threshold voltages. Memory cells having a threshold voltage corresponding to the erase state E retain the erase state E or are programmed to the lower program state LP. For example, the erase state E corresponds to a logic value '1', and the lower program state LP corresponds to a logic value '0'.

After LSB data is programmed, MSB data may be programmed. Memory cells having a threshold voltage corresponding to an erase state E of the LSB data retain the erase state E or are programmed to the first program state P1. Memory cells having a threshold voltage corresponding to the lower program state LP are programmed to the second program state P2 or the third program state P3. In an exemplary embodiment, the erase state E corresponds to a logic value '11'. The first program state P1 corresponds to a logic value '01', the second program state P2 corresponds to a logic value '10', and the third program state P3 corresponds to a logic value '00'. LSB data bits of the logic values '11', '01', '10', and '00' are '1', '1', '0', and '0'. MSB data bits of the logic values '11', '01', '10', and '00' are '1', '0', '1', and '0'.

It is assumed that LSB data is programmed at the first page. A number of write operations is carried out to the first and second areas 310 and 320 up to the NOP. In the case that the NOP is 2, an LSB program operation is performed two times to the first and second areas 310 and 320. An invalidation mark is written at the third area 330. Memory cells in the third area 330 are programmed to have a threshold voltage corresponding to a lower program state LP from a threshold voltage corresponding to an erase state E. That is, a write operation is carried out to the third area 330 such that LSB data goes from '1' to '0'.

It is assumed that MSB data is programmed at the first page. A number of write operations is carried out to the first and second areas 310 and 320 up to the NOP. In the case that the NOP is 2, an MSB program operation is performed two times to the first and second areas 310 and 320. An MSB program operation is carried out to memory cells in the third area 330, so that an invalidation mark is written. That is, a write operation is carried out to the third area 330 such that MSB data goes from '1' to '0'.

In an exemplary embodiment, LSB and MSB data all is written in the first page, and an invalidation mark for LSB and MSB is written. That is, an LSB program operation is carried out to the first and second areas 310 and 320 up to the NOP, and an MSB program operation is carried out to the first and second areas 310 and 320 up to the NOP. In the event that LSB data is invalidated or updated, an LSB program operation is carried out at the third area 330 so that an invalidation mark is written. For example, a write operation is carried out to the third area 330 such that LSB data goes from '1' to '0'. In the event that MSB data is invalidated or updated, an MSB program operation is carried out at the third area 330 so that an invalidation mark is written. For example, a write operation is carried out to the third area 330 such that MSB data goes from '1' to '0'.

Figure 8:
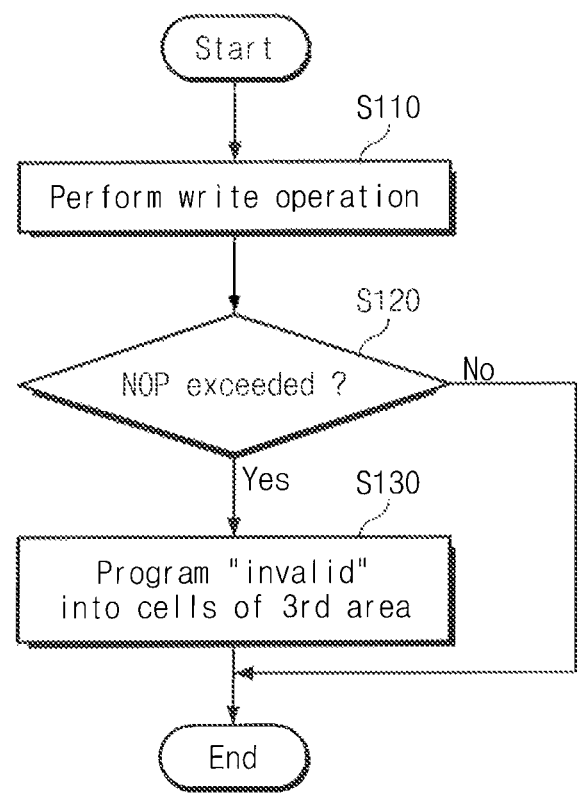
FIG. 8 is a flow chart showing a method of writing data in the third area of FIG. 3.

FIG. 8 is a flow chart showing a method of writing data in the third area of FIG. 3.

Referring to FIGS. 3 and 8, in operation S110, a write operation is carried out to the first and second areas 310 and 320 up to the NOP. As described in FIG. 3, a write operation is carried out to the first and second areas 310 and 320 up to the NOP. In an exemplary embodiment, in the event that the NOP is 2, the first and second areas 310 and 320 are divided, and the first and second program operations are carried out with respect to divided portions, respectively.

In operation S120, it is determined whether the NOP has been reached or exceeded. If the NOP has not been reached or exceeded, then the operation ends. However, if it is determined in operation S120 that the NOP has been reached or exceeded, then an invalidation mark is written at memory cells of the third area 330 in operation S130. In an exemplary embodiment, the invalidation mark is written at the third area 330 when the first page is updated or when a merge or garbage collection operation is carried out. If data of the first page is updated, data of the first and second areas 310 and 320 is copied to a page of another memory block in a memory cell array 111 (refer to FIG. 1). And, the invalidation mark is written at the third area. In the event that a merge operation is performed, valid/original data of pages in memory blocks is copied to one or more other memory blocks, and an invalidation mark is written at pages in which valid/original data was previously stored.

In an exemplary embodiment, at least two bits are written at the third area 330. A logic value of written bits is '0'.

Figure 9:
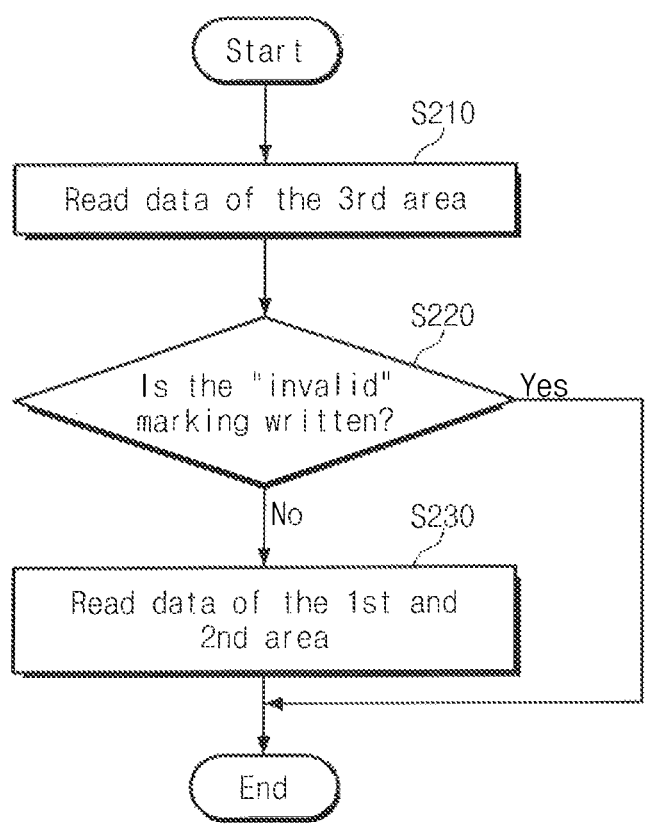
FIG. 9 is a flow chart showing a method of reading the first page in FIG. 3.

FIG. 9 is a flow chart showing a method of reading the first page in FIG. 3.

Referring to FIGS. 1, 3, and 9, in operation S210, there is read data stored in memory cells of the third area. A read and write circuit 113 receives data stored in the first page in response to the control of control logic 115. Received data of the first page is sent to a data input/output circuit 114. Data of the third area 330 received at the data input/output circuit 114 is sent to a controller 120.

Alternatively, at a read operation, the read and write circuit 113 receives data stored in the first page, and data of the third area 330 among the received data can be sent to the data input/output circuit 114. Data of the third area 330 received at the data input/output circuit 114 is sent to a controller 120.

The controller 120 can store received data of the third area 330. In this case, the controller 120 may include a buffer circuit (not shown). In an exemplary embodiment, the controller 120 may include RAM operating as the buffer circuit.

The controller 120 can store data of the third area 330 together with information corresponding block and row addresses. In a table form, it is possible to store data corresponding to the third area of each page indicating whether data stored in each page is valid or invalid. For example, data corresponding to the third area 330 of each page may be stored in the controller 120 together with a physical address of each page.

In operation S220, there is checked whether an invalidation mark is written at the third area 330. In an exemplary embodiment, the controller 120 may judge whether an invalidation mark is written, depending upon data of the third area 330 stored in the controller 120. The controller 120 may judge whether an invalidation mark is written, depending upon data corresponding to the third area 330 of each page stored in a table form.

In the event that an invalidation mark is written at the third area 330, the controller 120 can prohibit data of the first page from being read out. That is, the controller 120 controls the non-volatile memory device such that data of the first page is not read out.

In the event that no invalidation mark is written at the third area 330, in operation S230, the controller 120 sends a control signal CTRL to the non-volatile memory device 110 to receive data stored in the first and second areas 310 and 320.

When at least one or more bits in the third area 330 correspond to a logic value '1', the controller 120 judges that the invalidation mark is not written. In this case, the controller 120 sends the control signal CTRL to receive data stored in the first and second areas 310 and 320.

Figure 10:
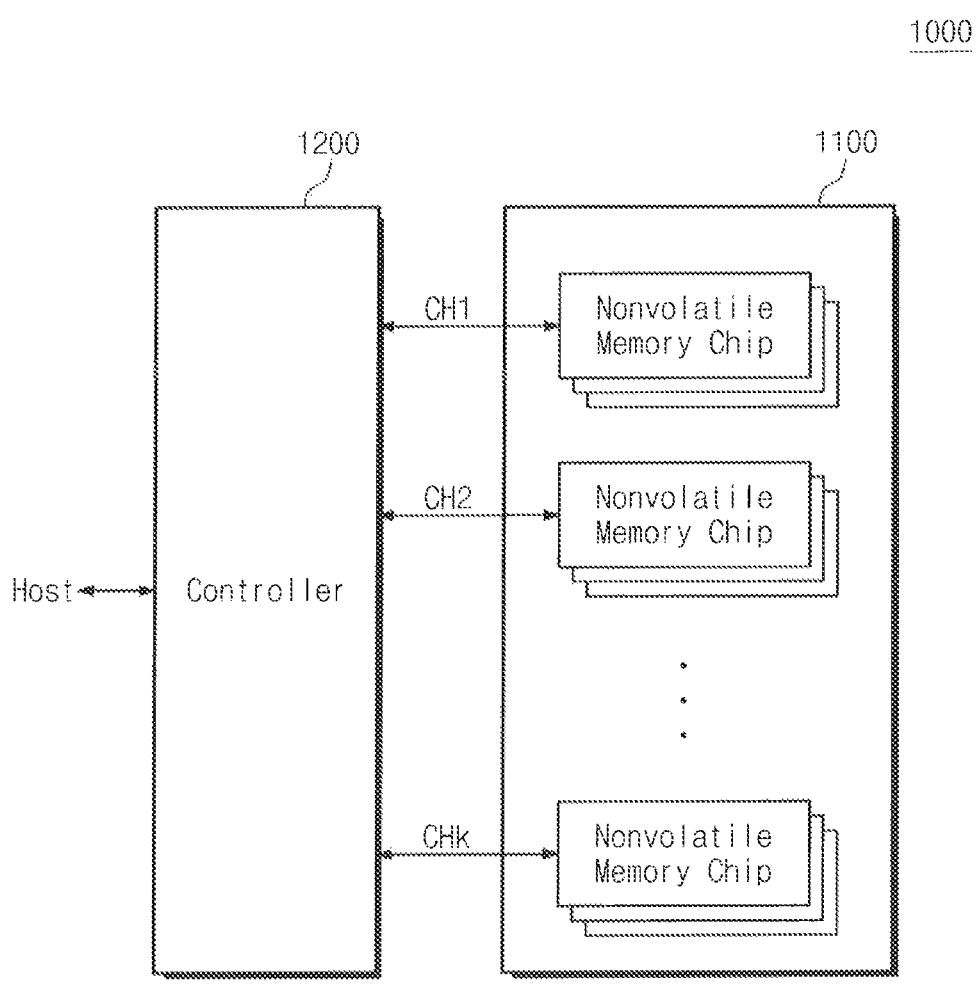
FIG. 10 is a block diagram showing an application of a memory system of FIG. 1.

FIG. 10 is a block diagram showing an application of a memory system of FIG. 1.

Referring to FIG. 10, a memory system 1000 includes a non-volatile memory device 1100 and a controller 1200. The non-volatile memory device 1100 includes a plurality of non-volatile memory chips, which are divided into a plurality of groups. Each group of non-volatile memory chips is configured to communicate with the controller 1200 via one common channel. In FIG. 10, there is illustrated an example that a plurality of non-volatile memory chips communicates with the controller 1200 via a plurality of, for example, K channels CH1 to CHk. Each non-volatile memory chip is configured in the same device as described in FIGS. 1 to 7. The controller 1200 is configured the same as described in FIGS. 1 to 7.

Figure 11:
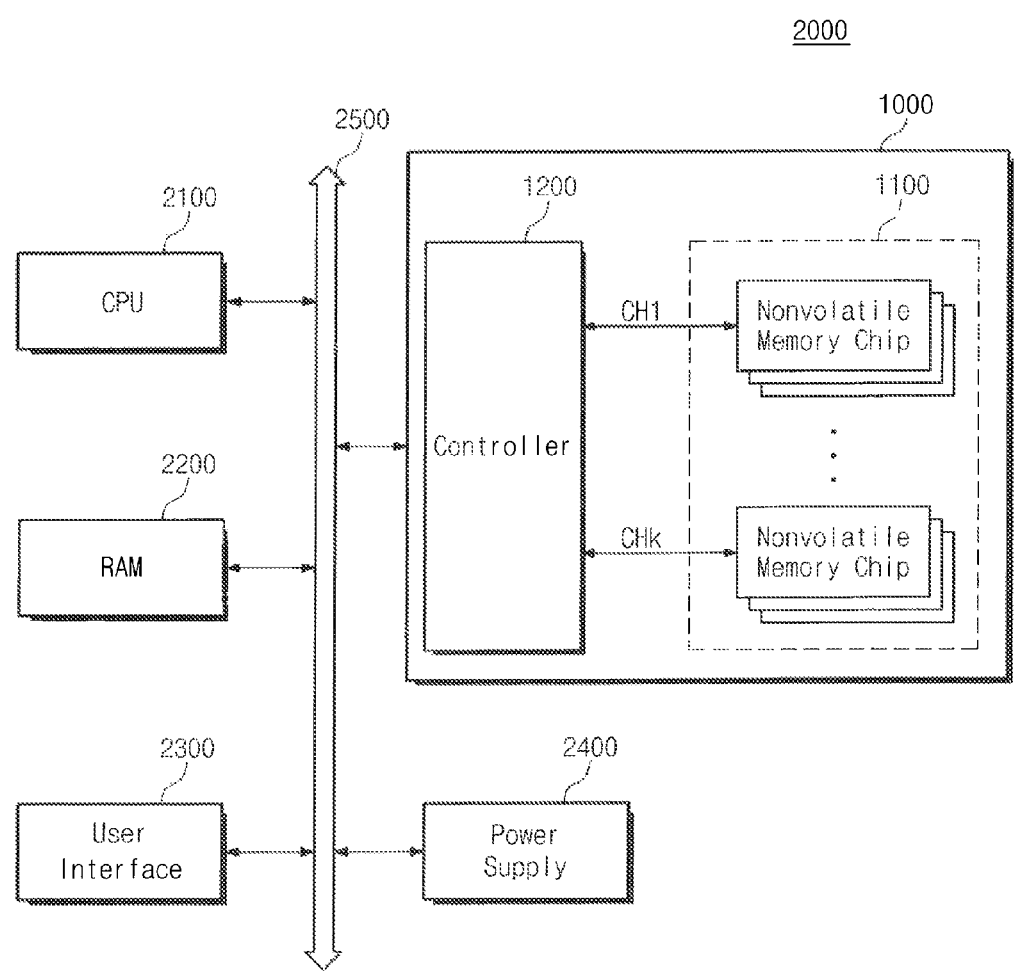
FIG. 11 is a block diagram showing a computing system including a memory system described in FIG. 10.

FIG. 11 is a block diagram showing a computing system including a memory system described in FIG. 10.

Referring to FIG. 11, a computing system 2000 includes CPU 2100, RAM 2200, a user interface 2300, a power supply 2400, and a memory system 1000.

The memory system 1000 is electrically connected with the elements 2100, 2200, 2300, and 2400 through a system bus 2500. Data provided via the user interface 2300 or processed by the CPU 2100 may be stored in the memory system 1000. The memory system 1000 was described with reference to FIG. 9, and includes a non-volatile memory device 1100 and a controller 1200.

In FIG. 11, there is illustrated an example that the non-volatile memory device 1100 is connected to the system bus 2500 via the controller 1200. But, the non-volatile memory device 1100 can be configured to be connected directly to the system bus 2500. In such a case, functions of the controller 120/1200 described in FIGS. 1 and 10 are executed by the CPU 2100.

In FIG. 11, there is illustrated an example that a memory system described in FIG. 10 is provided. But, the memory system 1000 can be replaced with a memory system 100 described in FIG. 1. In an exemplary embodiment, the computing system 2000 can be configured to include one or more of the memory systems 100 and 1000 described in FIGS. 1 and 10.

Figure 12A:
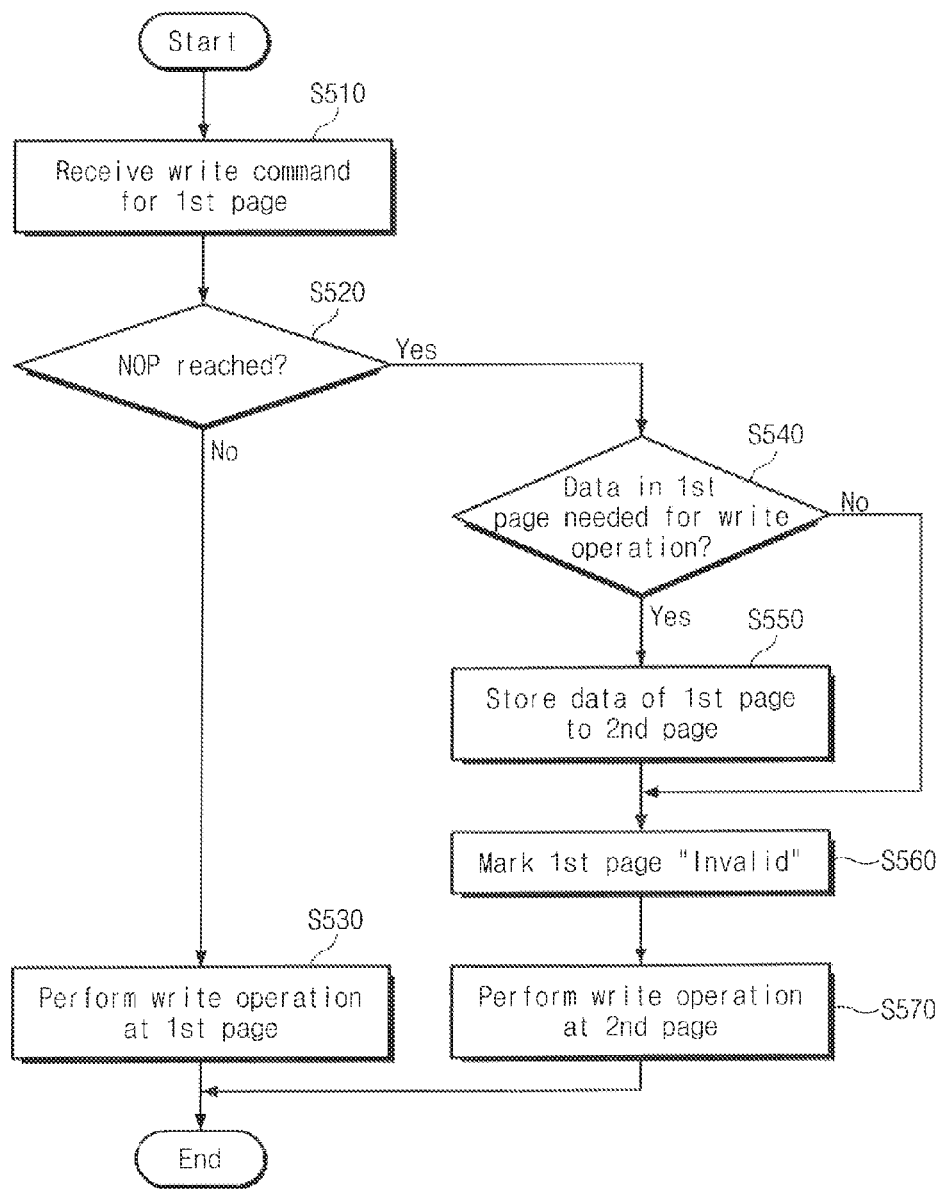
FIGS. 12A and 12B illustrate methods of controlling a non-volatile memory according to embodiments of the present general inventive concept.

FIG. 12A illustrates on operation of a memory system 100 according to an embodiment of the present general inventive concept. In operation S510, a write command is received that corresponds to a page (referred to as a "first page"). In operation S520 it is determined whether the NOP has been reached. For example, the controller 120 may compare a value corresponding to the number of write operations performed on the first page with a predetermined value corresponding to the NOP. If the write command received in operation S510 would cause the number of write commands performed on the first page to correspond to the NOP, the operation may proceed to operation S540. On the other hand, if it is determined that the number of write commands has not yet reached the NOP, the write operation may be performed on the first page in operation S530.

In operation S540, it may be determined whether the data of the first page is needed to perform the write command. For example, one type of write command may merely include over-writing pre-existing data, and this would not require the use of the data of the first page. However, if the write command involved a merger of new data with pre-existing data or moving of pre-existing data, then the write command may require the use of the previously-stored data. In such a case, the data previously-stored in the first page may be transferred to a second page in operation S550, and the first page may be marked "invalid" in operation S560. Then the write operation may be performed at the second page in operation S570.

If it is determined in operation S540 that the data of the first page is not needed to perform the write operation, the first page may be marked "invalid" in operation S560, and the write operation may be automatically performed at the second page.

Figure 12B:
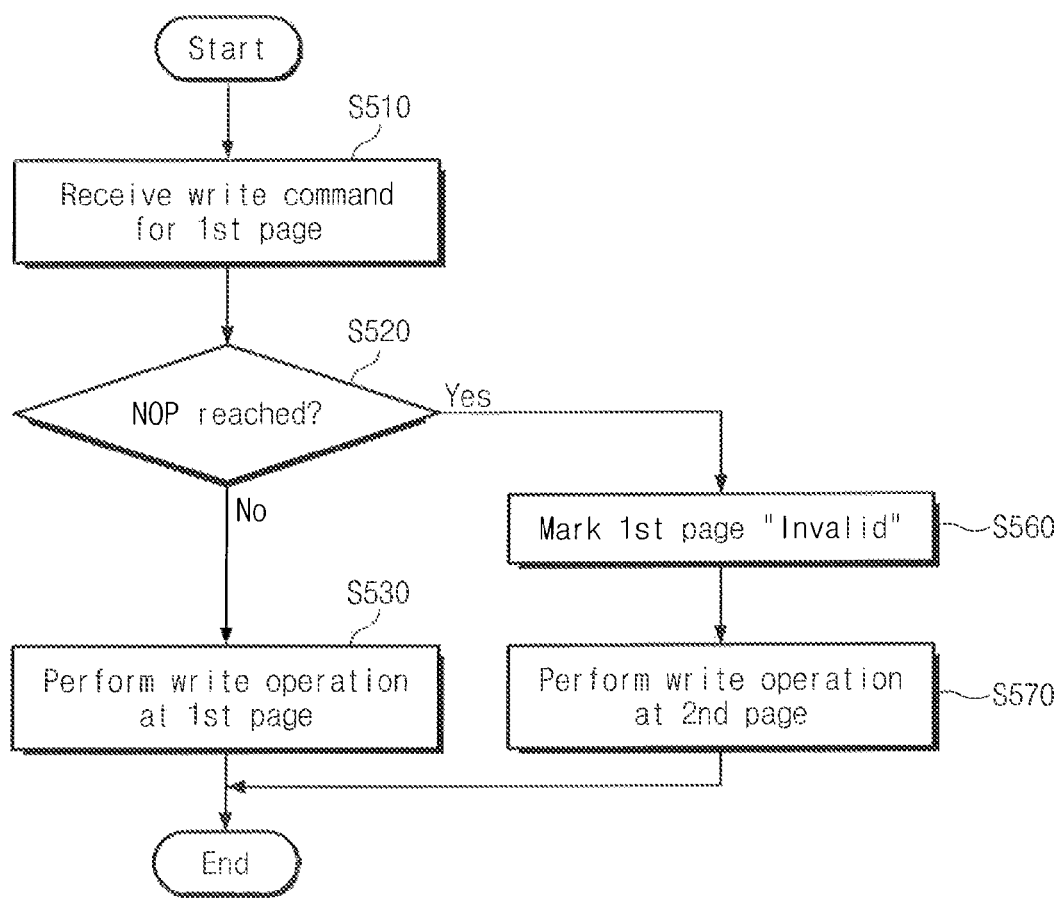

However, as illustrated in FIG. 12B, the present general inventive concept may also be implemented without determining whether data in the first page is needed to perform the write operation. For example, it may be assumed that any data that is needed has previously been read, so that it is not necessary to store the existing data of the first page into a new location. According to one such example, the data from the first page may be read by the controller 120 and stored in a buffer. Then, if it is desired to merge the data or modify the data, the merger and modification may be performed using the memory (such as the buffer) of the controller 120. If it is determined in operation S520 that the NOP of the first page has been reached so that the merged data cannot be performed in the first page, then the first page may be marked "invalid" in operation S560, and the resulting data stored in the buffer of the controller 120 may be written to the second page in operation S570.

According to the present general inventive concept, it is possible to efficiently use a storage space of a non-volatile memory device as compared with the case that invalidation marks are managed using an independent meta area. Further, an operating characteristic of a memory system including a non-volatile memory device can be improved since no independent software or hardware is needed to manage a meta area.

Although illustrated in figures, the inventive concept includes a method of managing a non-volatile memory device which includes a user data region (or, user data storing blocks) and a meta data region (or, meta data storing blocks). The method comprises judging whether data stored in the user data region is invalidated; and if data stored in the user data region is invalidated, storing an invalidation mark in a page of the user data region in which the invalidated data is stored.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. An operating method of non-volatile memory system having a plurality of pages, the method comprising:
    receiving a write command to write data into a first area of a page among the plurality of pages, wherein the first area is divided into a plurality of regions based on a predetermined number of partial programs (NOP); and
    performing a write operation on one of the plurality of regions in response to the received write command wherein performing the write operation on one of the plurality of regions comprises writing an invalidation mark on a second area of the page based on whether a write number of the page has reached or exceeded the NOP,
    wherein the invalidation mark is information indicating that data in the page is invalid.

2. The operating method of claim 1, wherein performing the write operation comprises:
    performing the write operation corresponding to the write command on another page, when the write number of the page has reached or has exceeded the NOP.

3. The operating method of claim 1, wherein user data or spare data is stored in the first area of the page and the invalidation mark is stored in the second area to indicate whether the page is valid or invalid.

4. The operating method of claim 3, wherein writing the invalidation mark on the second area of the page comprises changing a program state of each memory cell of the second area of the page to a same program state.

5. The operating method of claim 4, wherein the second area of the page is located within the first area of the page.

6. The operating method of claim 1, further comprising:
    receiving a read command to read data in the first area of the page among the plurality of pages;
    determining whether the page is valid; and
    preventing a read operation of the page corresponding to the read command when the page is determined to be invalid.

7. The operating method of claim 6, wherein determining whether the page is valid comprises reading the second area of the page.

8. The operating method of claim 7, wherein the page is determined to be invalid if the second area of the page includes the invalidation mark.

9. The operating method of claim 1, wherein performing the write operation on the first area of the page based on the NOP comprises:
    comparing a number of write operations performed on the page with a predetermined NOP; and
    if performing the write operation on the first area of the page would cause the number of write operations performed on the page to equal or exceed the predetermined NOP, writing the invalidation mark on the second area of the page.

10. A memory system, comprising:
    a non-volatile memory device having first to nth pages guaranteed a write number up to a predetermined number of partial programs (NOP); and
    a controller to control the non-volatile memory,
    wherein each of the first to nth pages includes first and second areas, and wherein the first area is divided into a plurality of regions based on the predetermined NOP,
    wherein the controller is configured to receive a write command to write data on one among the plurality of regions of the first area of the first page,
    wherein the controller is configured to determine whether a write number of the first page exceeds the predetermined NOP,
    wherein the controller is configured to write an invalidation mark on the second area of the first page based on whether the write number of the first page exceeds the predetermined NOP, and
    wherein the invalidation mark is information indicating that data in the page is invalid.

11. The memory system of claim 10,
    wherein the controller is configured to perform a write operation corresponding to the received command on the second page when the write number of the first page exceeds the predetermined NOP.

12. The memory system of claim 10, wherein user data or spare data is stored in the first area of the first page and the invalidation mark is stored in the second area of the first page to indicate whether the first page is valid or invalid.

13. The memory system of claim 12, wherein the controller writes the invalidation mark on the second area of the first page by changing a program state of each memory cell of the second area of the first page to a same program state.

14. The memory system of claim 13, wherein the second area of the first page is located within the first area of the first page.

15. The memory system of claim 10, wherein the controller includes a memory to store a table to indicate which pages among the first to nth pages are invalid.

16. The memory system of claim 10, wherein the non-volatile memory device comprises:
    one or more memory cells corresponding to the second area of the first page, the one or more memory cells having a threshold voltage higher than a read voltage of the non-volatile memory device.

* * * * *